US010747239B2

(12) United States Patent
Nishizato (10) Patent No.: US 10,747,239 B2
(45) Date of Patent: Aug. 18, 2020

(54) FLUID CONTROL DEVICE, FLUID CONTROL METHOD, AND PROGRAM RECORDING MEDIUM RECORDED WITH PROGRAM FOR FLUID CONTROL DEVICE

(71) Applicant: HORIBA STEC, Co., Ltd., Kyoto-shi, Kyoto (JP)

(72) Inventor: Hiroshi Nishizato, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 169 days.

(21) Appl. No.: 16/027,232

(22) Filed: Jul. 3, 2018

(65) Prior Publication Data

US 2019/0011936 A1    Jan. 10, 2019

(30) Foreign Application Priority Data

Jul. 5, 2017 (JP) ................................. 2017-131951

(51) Int. Cl.
*G05B 19/416* (2006.01)
*G05D 7/06* (2006.01)
(Continued)

(52) U.S. Cl.
CPC ......... *G05D 7/0647* (2013.01); *G05B 19/416* (2013.01); *G05D 7/06* (2013.01); *G05D 7/0635* (2013.01); *G05B 2219/37371* (2013.01)

(58) Field of Classification Search
CPC .. F15B 2211/30555; F15B 2211/30535; F15B 11/05; F15B 13/029; F15B 13/0433;
(Continued)

(56) References Cited

U.S. PATENT DOCUMENTS 9,904,297 B2 * 2/2018 Monkowski ......... G05D 7/0635
2002/0152985 A1 * 10/2002 Wolff .................. F02D 19/0631
123/305

(Continued)

FOREIGN PATENT DOCUMENTS

DE    102009057359 A1    6/2010
JP       2017509793 A    4/2017
WO     2015138073 A1    9/2015

OTHER PUBLICATIONS

European Patent Office, Extended European Search Report Issued in Application No. 1818632.3, dated Apr. 9, 2019 Germany, 9 pages.

*Primary Examiner* — Michael J Brown
(74) *Attorney, Agent, or Firm* — Alleman Hall Creasman & Tuttle LLP (57) ABSTRACT

In order to provide a fluid control device capable of making the control accuracy of the flow rate or pressure of fluid passing through a valve during each ON interval of pulse control higher than before, the control mechanism includes: a pulse signal generator adapted to input a pulse signal having a predetermined pulse height and a predetermined pulse width to the first valve; a feedback value calculator adapted to, on the basis of a pressure value measured by a pressure sensor, as a feedback value, calculate the time integrated value of a pressure drop occurring in an internal volume during an ON interval when the first valve is opened; and a signal compensator adapted to, on the basis of the deviation between the feedback value and a reference value, compensate the pulse signal to be inputted from the pulse signal generator to the first valve.

10 Claims, 10 Drawing Sheets

(51) Int. Cl.
*F15B 11/05* (2006.01)
*F15B 13/02* (2006.01)

(58) Field of Classification Search
CPC ... F15B 13/026; G05B 13/024; G05D 7/0647;
G05D 7/06; G05D 7/0635
USPC .................................................. 700/254, 282
See application file for complete search history.

(56) References Cited

U.S. PATENT DOCUMENTS

2006/0035470 A1* 2/2006 Horii ..................... C23C 16/405
438/758
2012/0209436 A1* 8/2012 Takijiri ................ G05D 7/0635
700/282
2013/0025715 A1* 1/2013 Yamaguchi ............... F17D 1/00
137/561 R
2017/0145564 A1* 5/2017 Bertuch .............. C23C 16/4482

* cited by examiner

FLUID CONTROL DEVICE, FLUID CONTROL METHOD, AND PROGRAM RECORDING MEDIUM RECORDED WITH PROGRAM FOR FLUID CONTROL DEVICE

TECHNICAL FIELD

The present invention relates to a fluid control device used to perform pulse control of the physical amount of each of various gases in, for example, a semiconductor manufacturing apparatus.

BACKGROUND ART

For example, an atomic layer deposition (ALD) apparatus which is a kind of semiconductor deposition apparatus is intended to deposit a film having a thickness of the order of angstroms by alternately introducing component gas and water vapor gas only for a short time each.

For this purpose, in order to make it possible to introduce required flow rates of various gases for depositing a film of, for example, one atomic layer into a deposition chamber, mass flow controllers for controlling the flow rates of the various gases to be introduced into the deposition chamber are driven by pulse control (Patent Literature 1).

Such a mass flow controller driven by the pulse control includes: a resistor arranged in a flow path; a valve arranged on the downstream side of the resistor; and a control mechanism adapted to make the valve alternately repeat an ON interval when the valve is opened and an OFF interval when the valve is closed. More specifically, the mass flow controller flows gas into the internal volume of the flow path between the resistor and the valve to charge it until a predetermined pressure is reached during the OFF interval, and during the ON interval, flows the gas charged in the internal volume to the downstream side.

Further, the valve includes a displacement sensor for measuring the opening level thereof, and the control mechanism is configured to, during the ON interval, perform valve opening level feedback control so that a measured opening level measured by the displacement sensor matches a setting opening level corresponding to the flow rate of the gas to be flowed.

However, as a result of intensive examination by the present inventor, it has been found that in particular, in the case of short pulse width, even when performing the opening level feedback control as described above, the flow rate of the gas actually flowing to the downstream side of the valve have an error with respect to an expected flow rate. That is, it is difficult to achieve flow rate accuracy required for, for example, an atomic layer deposition apparatus only using the simple opening level feedback.

CITATION LIST

Patent Literatures

Patent Literature 1: Japanese Unexamined Patent Application Publication No. 2017-509793

SUMMARY OF INVENTION

Technical Problem

The present invention has been made in consideration of the problem as described above, and intends to provide a fluid control device capable of making the control accuracy of the flow rate or pressure of fluid passing through a valve during each ON interval of pulse control higher than before.

Solution to Problem

That is, the fluid control device according to the present invention includes: a resistor arranged in a flow path through which fluid flows; a first valve arranged on a downstream side than the resistor in the flow path; a pressure sensor that is arranged between the resistor and the first valve in the flow path and measures the pressure of the fluid in the internal volume between the resistor and the first valve; and a control mechanism adapted to control the first valve. In addition, the control mechanism includes: a pulse signal generator adapted to input a pulse signal having a predetermined pulse height and a predetermined pulse width to the first valve; a feedback value calculator adapted to, on the basis of a pressure value measured by the pressure sensor, as a feedback value, calculate the time integrated value of a pressure drop occurring in the internal volume during an ON interval when the first valve is opened; and a signal compensator adapted to, on the basis of the deviation between the feedback value and a reference value, compensate the pulse signal to be inputted from the pulse signal generator to the first valve.

Knowledge first found out by the present inventor says that as compared with a conventional case of measuring a valve opening level to perform pulse control of the first valve on the basis of opening level feedback, in the case of feeding back the time integrated value of a pressure drop during an ON interval to perform pulse control of the first valve, the control accuracy of flow rate or pressure to be achieved can be improved.

Also, between the time integrated value of a pressure drop and the flow rate of the fluid passing through the first valve during an ON interval, good linearity is obtained, and therefore as control quantity, the time integrated value is more easily handled than the opening level.

The reason that such control characteristics can be obtained is considered to be that in the case of feeding back the opening level, even when pressure on the upstream side of the first valve varies, such information and a value related to an actual flow rate are not fed back to cause an error, whereas in the case of feeding back the time integrated value of a pressure drop, it is a value related to an actual flow rate, and therefore a flow rate error occurring can be fed back to make a compensation.

In order to keep a target flow rate during each ON interval as much as possible, it is only necessary that the reference value is the actual value of the time integrated value of a pressure drop when the flow rate of the fluid passing through the first valve reaches the target flow rate.

For example, in order to keep constant the flow rate of the fluid flowing when each pulse is inputted and thereby keep deposited film thickness constant in ALD or the like without changing the time until a recipe is completed, it is only necessary that the signal compensator is configured to change the pulse height of the pulse signal with the pulse width kept constant so as to decrease the deviation between the feedback value and the reference value. Such a configuration makes it possible to deposit a high-quality film with the time necessary for a film deposition process kept as scheduled and the number of processing steps per unit time remaining constant.

Other control embodiments for keeping constant the flow rate or pressure of the fluid passing through the first valve during each ON interval include one in which the signal compensator is configured to change the pulse width of the pulse signal with the pulse height kept constant so as to decrease the deviation between the feedback value and the reference value.

In order to keep the pressure of the fluid in the internal volume on the upstream side of the first valve at a predetermined pressure before the start of each ON interval and thereby make the flow rate or pressure of the fluid passing through the first valve during each ON interval less likely to vary, it is only necessary that the resistor is a second valve whose opening level is controllable, and the control mechanism further includes a second valve controller adapted to control the second valve so as to decrease the deviation between a pressure value measured by the pressure sensor and a setting pressure value during an OFF interval when the first valve is closed. In such a configuration, the time integrated value of a pressure drop exhibits high linearity over a wider flow rate range, and therefore only one calibration curve enables a control range to be widely ensured.

In order to make it possible to monitor whether or not the first valve is operated by pulse control as expected, it is only necessary that the first valve further includes a displacement sensor adapted to measure the opening level thereof.

Fluid control devices of other embodiments according to the present invention include one including: a second valve that is a resistor arranged in a flow path through which fluid flows; a first valve arranged on a downstream side than the resistor in the flow path; a pressure sensor that is arranged between the resistor and the first valve in the flow path and measures the pressure of the fluid in the internal volume between the resistor and the first valve; and a control mechanism adapted to control the first valve. In addition to this, the first valve further includes a displacement sensor adapted to measure the opening level thereof, and the control mechanism includes: a second valve controller adapted to control the second valve so as to decrease the deviation between a pressure value measured by the pressure sensor and a setting pressure value during an OFF interval when the first valve is closed; a pulse signal generator adapted to input a pulse signal having a predetermined pulse height and a predetermined pulse width to the first valve; and a signal compensator adapted to, on the basis of the deviation between a measured opening level measured by the displacement sensor and a predetermined setting opening level during an ON interval when the first valve is opened, compensate the pulse signal to be inputted from the pulse signal generator to the first valve.

In such a configuration, even when performing pulse control of the first valve on the basis of the opening level feedback, the fluid is charged so as to keep the pressure inside the internal volume at a predetermined pressure during the OFF interval, and therefore the control accuracy of the flow rate or pressure of the fluid passing through the first valve during the ON interval can be more improved than before.

The use of a fluid control method using a fluid control device including: a resistor arranged in a flow path through which fluid flows; a first valve arranged on a downstream side than the resistor in the flow path; and a pressure sensor that is arranged between the resistor and the first valve in the flow path and measures the pressure of the fluid in the internal volume between the resistor and the first valve, and including a control step of controlling the first valve, in which the control step includes: a pulse signal generation step of inputting a pulse signal having a predetermined pulse height and a predetermined pulse width to the first valve; a feedback step of, on the basis of a pressure value measured by the pressure sensor, as a feedback value, calculating the time integrated value of a pressure drop occurring in the internal volume during an ON interval when the first valve is opened; and a signal compensation step of, on the basis of the deviation between the feedback value and a reference value, after the calculation of the feedback value, compensating the pulse signal to be inputted from the pulse signal generator to the first valve enables a flow rate or pressure to be controlled with higher accuracy than when performing pulse control of the first valve on the basis of opening level feedback.

In order to make it possible to produce the same effect as that of the fluid control device according to the present invention only by updating a program for an existing fluid control device, it is only necessary to use a fluid control program used for the fluid control device including: a resistor arranged in a flow path through which fluid flows; a first valve arranged on a downstream side than the resistor in the flow path; a pressure sensor that is arranged between the resistor and the first valve in the flow path and measures the pressure of the fluid in the internal volume between the resistor and the first valve; and a control mechanism adapted to control the first valve, in which the control mechanism has a computer; and instructing the computer to fulfill functions as: and a pulse signal generator adapted to input a pulse signal having a predetermined pulse height and a predetermined pulse width to the first valve; a feedback value calculator adapted to, on the basis of a pressure value measured by the pressure sensor, as a feedback value, calculate the time integrated value of a pressure drop occurring in the internal volume during an ON interval when the first valve is opened; and a signal compensator adapted to, on the basis of the deviation between the feedback value and a reference value, after the calculation of the feedback value, compensate the pulse signal to be inputted from the pulse signal generator to the first valve.

In addition, the program for the fluid control device may be one electronically distributed or stored in a program recording medium such as a CD, DVD, HDD, or flash memory.

Advantageous Effects of Invention

As described above, since the fluid control device according to the present invention performs the pulse control of the opening level of the first valve on the basis of the time integrated value of a pressure drop during an ON interval, as compared with a case of feeding back the opening level itself to perform the pulse control, the control accuracy of the flow rate or pressure of the fluid passing through the first valve during the ON interval can be improved. As a result, only a required minute amount of each of various gases can be accurately supplied into a deposition chamber during each ON interval, and therefore highly accurate film deposition can be performed in, for example, an ALD apparatus or the like.

DESCRIPTION OF EMBODIMENTS

Configuration of First Embodiment

Figure 1:
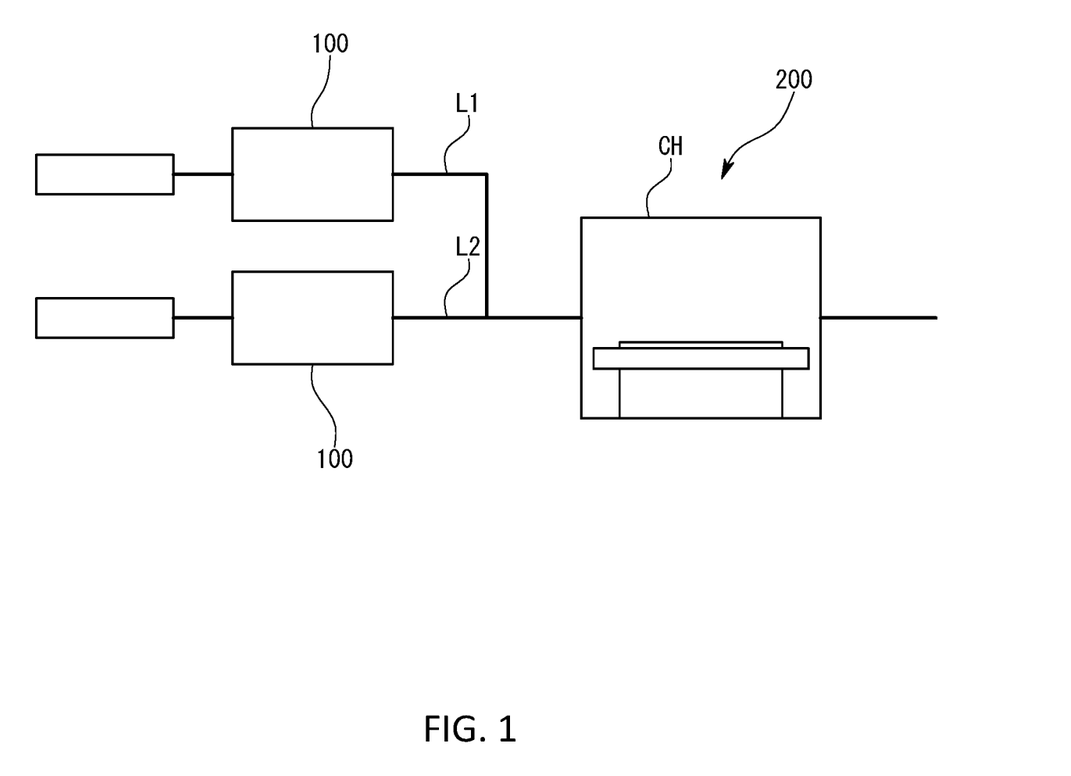
FIG. 1 is a schematic diagram illustrating a fluid control device according to a first embodiment of the present invention and an atomic layer deposition apparatus using the fluid control device.

A fluid control device 100 according to a first embodiment of the present invention will be described with reference to FIGS. 1 to 5. The fluid control device 100 of the first embodiment is one that as illustrated in FIG. 1, performs pulse control to intermittently supply each of various gases to a deposition chamber CH of an atomic layer deposition (ALD) apparatus 200. One fluid control device 100 is arranged in each of a first gas supply flow path L1 and a second gas supply flow path L2 communicatively connecting to the deposition chamber CH. The first gas supply flow path L1 is one for supplying component gas such as TMA referred to as a precursor into the deposition chamber CH, and the second gas supply flow path L2 is one for supplying gas such as water vapor gas into the deposition chamber CH.

Between the respective fluid control devices 100 arranged in the first gas supply flow path L1 and the second gas supply flow path L2, pulse control timing is changed, and thereby the component gas and the water vapor gas are alternately supplied into the deposition chamber CH. Also, the respective fluid control devices 100 are configured to supply corresponding gases having flow rates necessary and sufficient to form one atomic layer during one pulse into the deposition chamber CH.

Figure 2:
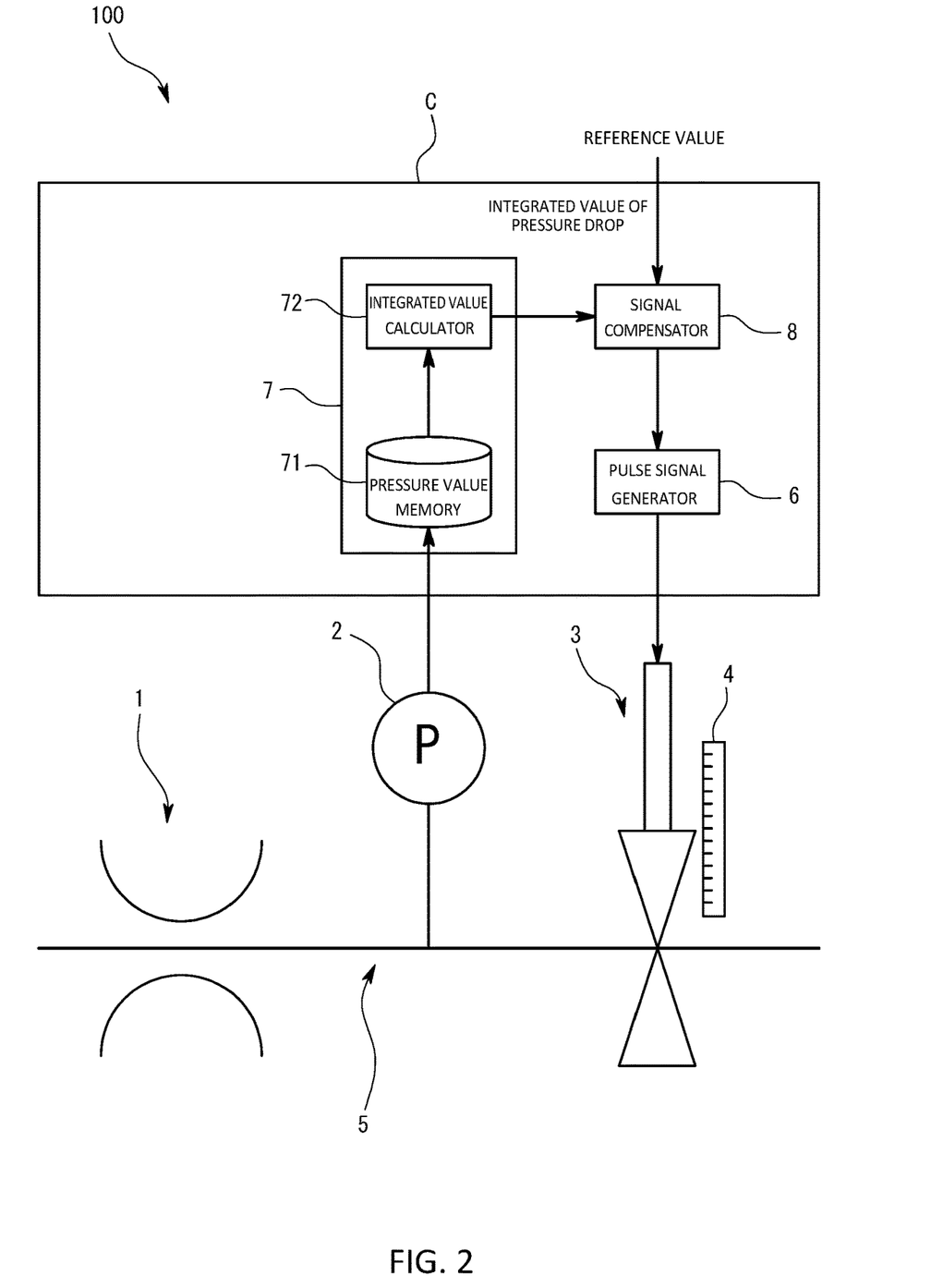
FIG. 2 is a schematic diagram illustrating the hardware and software configuration of the fluid control device in the first embodiment.

The respective fluid control devices 100 have substantially the same configuration, and therefore in the following, while focusing on one of the fluid control devices 100, the details of it will be described with reference to FIG. 2.

The fluid control device 100 is one that includes a resistor 1, pressure sensor 2, and first valve 3 sequentially from the upstream side of a flow path, and further includes a control mechanism C adapted to perform pulse control of the first valve 3 on the basis of the output of the pressure sensor 2.

The resistor 1 is one such as an orifice that generates flow path resistance in the flow path. Note that the first embodiment is adapted to fix the inside diameter of the orifice, and therefore fix the flow path resistance.

The pressure sensor 2 is one that measures the pressure of fluid in the internal volume 5 of the flow path between the resistor 1 and the first valve 3.

The first valve 3 is configured to drive a valve body by, for example, a piezo actuator, and be able to change an opening level that is the gap between the valve body and a valve seat. The first valve 3 further incorporates a displacement sensor 4, and is configured to be able to measure the displacement amount of the valve body to measure the opening level.

The control mechanism C is one that is adapted to control the first valve 3 and makes the first valve 3 alternately repeat an ON interval when the first valve 3 is opened and an OFF interval when the first valve 3 is closed. More specifically, the control mechanism C is a so-called computer including a CPU, a memory, A/D and D/A converters, input/output means, and the like, and configured to fulfill functions as at least a pulse signal generator 6, feedback value calculator 7, and signal compensator 8 by executing a program for the fluid control device 100 stored in the memory to operate various devices together.

Figure 3:
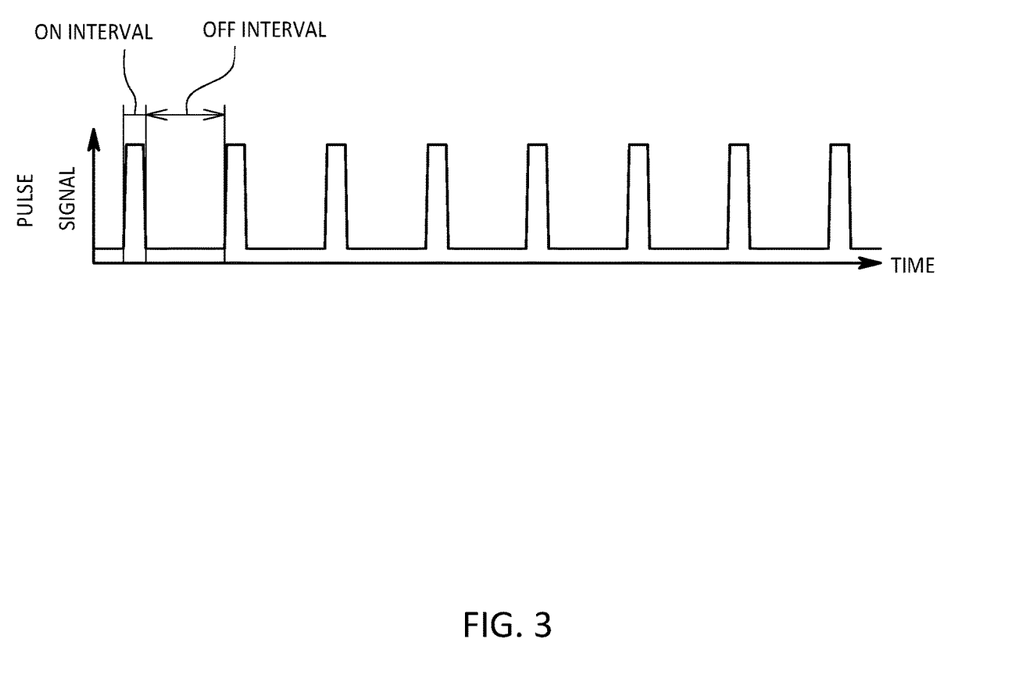
FIG. 3 is a schematic graph illustrating a pulse signal inputted to a first valve in the first embodiment.
Figure 4:
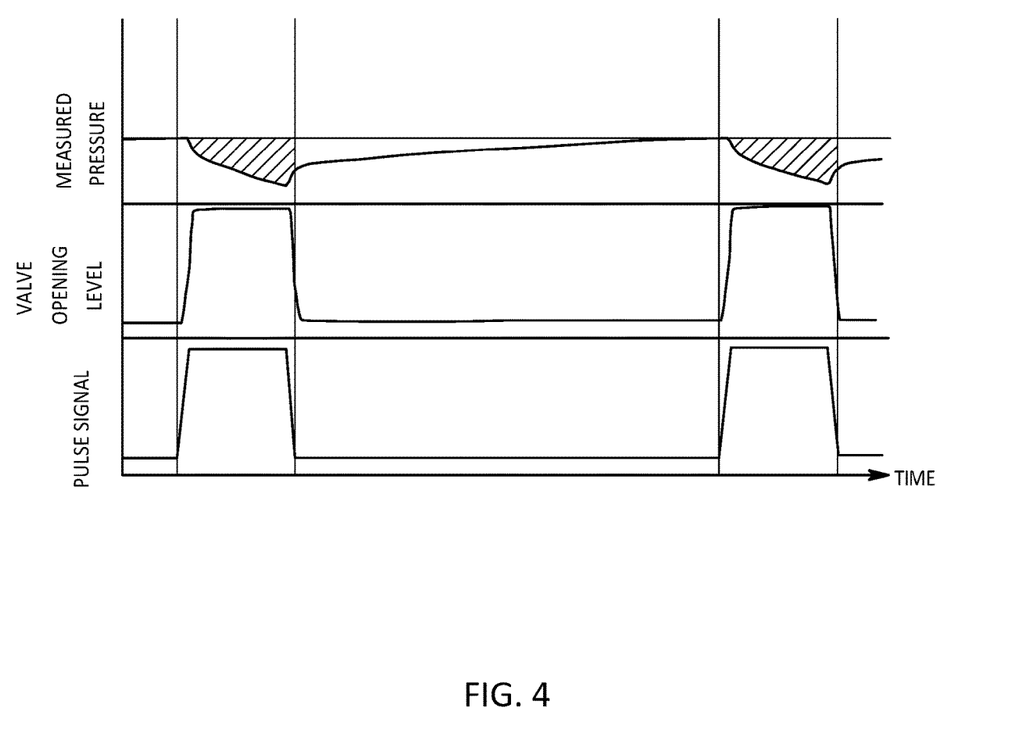
FIG. 4 is a schematic graph illustrating the first valve, a change in pressure of fluid in an internal volume, and the time integrated value of a pressure drop based on pulse control in the first embodiment.

The pulse signal generator 6 inputs a pulse signal having a predetermined pulse height and a predetermined pulse width to the first valve 3. In the first embodiment, the pulse signal generator 6 is configured to input a voltage pulse signal as illustrated in FIG. 3 to the piezo actuator of the first valve 3 with a predetermined period. That is, the interval when the pulse signal generator 6 inputs the pulse signal to the first valve 3 corresponds to the ON interval when the first valve 3 is opened, whereas the interval between adjacent pulse signals, when no pulse signal is inputted to the first valve 3, corresponds to the OFF interval when the first valve 3 is closed. Also, the pulse height of the pulse signal is configured to be successively changeable by the below-described compensator, but the pulse width and the pulse signal period are fixed. The pulse width is set to a width of the order of, for example, 100 ms, and the period is set to a period of the order of 100 ms. Note that the pulse width value and the pulse signal period value are only examples and may be appropriately set to any values depending on application.

The feedback value calculator 7 calculates, on the basis of a pressure value measured by the pressure sensor 2, the time integrated value of a pressure drop occurring in the internal volume 5 during the ON interval as a feedback value. That is, as illustrated in a graph of FIG. 4, when the pulse signal is inputted to the first valve 3 to open the first valve 3, the gas charged in the internal volume 5 passes through the first valve 3, and thereby the amount of the gas in the internal volume 5 is decreased, causing a pressure drop. The pressure drop continues from starting the input of the pulse signal to open the first valve 3 to ending the input of the pulse signal to close the first valve 3. In the first embodiment, the feedback value corresponds to the area of a hatched part in the graph of FIG. 4, and the time integrated value of the pressure drop can be calculated by, for example, quadrature by parts.

More specifically, the feedback value calculator 7 includes: a Pressure value memory 71 that successively stores a pressure value measured by the pressure sensor 2; and an integrated value calculator 72 that calculates the time integrated value of a pressure drop on the basis of pressure values stored in the Pressure value memory 71.

The Pressure value memory 71 is one that stores time series data on a pressure value, for example, from the point when the pulse signal is inputted to the first valve 3 by the pulse signal generator 6 to the point of the end of the input.

The integrated value calculator 72 calculates the time integrated value of a pressure drop on the basis of the time series data on a pressure value stored in the Pressure value memory 71. For example, the integrated value calculator 72 multiplies the difference between an initial pressure value at the point when the pulse signal is inputted to the first valve 3 and a pressure value measured at each point by sampling time to calculate the area of the hatching part in FIG. 4 by quadrature by parts, and outputs it as the feedback value.

The signal compensator 8 compensates, on the basis of the deviation between the feedback value and a reference value, a pulse signal to be inputted from the pulse signal generator 6 to the first valve 3 after the feedback value has been calculated. More specifically, the signal compensator 8 compensates the pulse height of a pulse signal to be inputted next to one pulse signal so as to decrease the deviation between the feedback value calculated from a voltage drop occurring when the one pulse signal is inputted to the first valve 3 and the reference value. When doing this, the signal compensator 8 changes the pulse height of the pulse signal to be outputted next by changing the setting of the pulse signal generator 6. That is, the signal compensator 8 successively compensates the pulse height of a pulse signal to be outputted from the pulse signal generator 6 on the basis of the time integrated value of a pressure drop obtained by a pulse signal inputted last time.

Note that the reference value is a predetermined value, and the actual value of the time integrated value of a voltage drop when the flow rate of the fluid passing through the first valve 3 reaches a target flow rate. That is, as the reference value, the time integrated value of a pressure drop corresponding to the target flow rate at which the fluid is desired to be flowed to the deposition chamber CH during one ON interval is preliminarily acquired through experiment or the like.

Operation of First Embodiment

Figure 5:
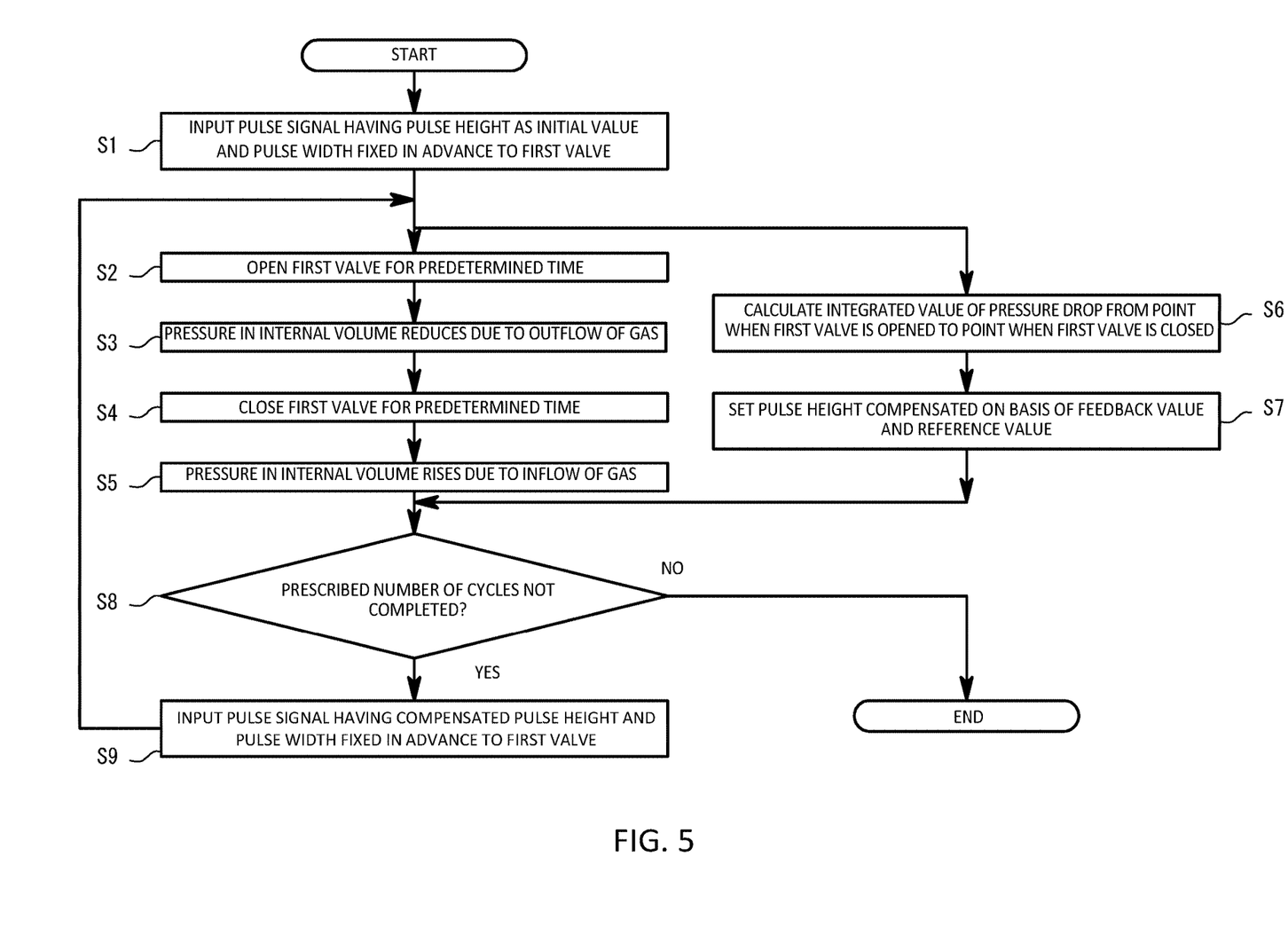
FIG. 5 is a flowchart illustrating the operation of the fluid control device in the first embodiment.

Next, operation based on flow rate pulse control by the fluid control device 100 of the first embodiment will be described with reference to a flowchart of FIG. 5.

First, in a state where the gas having sufficient pressure is charged in the internal volume 5, the fluid control device 100 starts the flow rate control based on the pulse control. That is, the pulse signal generator 6 inputs a pulse signal having a pulse height and a pulse width as the initial settings to the first valve 3 (Step S1).

The first valve 3 is opened for a predetermined time corresponding to the pulse width of the pulse signal (Step S2). While the first valve 3 is being opened, gas charged in the internal volume 5 flows to the deposition chamber CH through the first valve 3. Accordingly, the pressure of the gas in the internal volume 5 continues to decrease during the ON interval as illustrated in the graph of FIG. 5 (Step S3). When the input of the pulse signal to the first valve 3 is ended, a state where the first valve 3 is closed is kept for a predetermined time (Step S4). While the first valve 3 is being closed, new gas is charged in the internal volume 5 from the upstream side through the resistor 1 to increase the pressure of the gas (Step S5).

In parallel with Steps S2 to S5, the feedback value calculator 7 calculates as the feedback value the time integrated value of a pressure drop during the ON interval from the opening to closing of the first valve 3 (Step S6). Subsequently, on the basis of the deviation between the feedback value and the reference value, the signal compensator 8 compensates the pulse height of a pulse signal to be outputted next from the pulse signal generator 6 (Step S7). For example, when the feedback value is smaller than the reference value, the pulse height is changed to be higher than the last time because of an insufficient flow rate. On the other hand, when the feedback value is larger than the reference value, the pulse height is changed to be lower than the last time because of an excessive flow rate.

Then, the pulse signal generator 6 determines whether or not a prescribed number of pulse signals have been outputted (Step S8), and when the prescribed number is not reached, inputs the pulse signal having the pulse height compensated in Step S8 to the first valve 3 with the same pulse width as the last time kept (Step S9).

After that, until the prescribed number of pulse signals are inputted to the first valve 3, the operation from Steps S2 to S9 is repeated. Upon completion of all cycles, the operation of the fluid control device is ended.

Effects of First Embodiment

Since the fluid control device 100 of the first embodiment configured as described above is adapted to successively compensate the pulse height of a pulse signal to be inputted to the first valve 3 with the time integrated value of a pressure drop during an ON interval as the feedback value, the flow rate of the gas passing through the first valve 3 during each ON interval can be uniformly kept at a target flow rate.

Figure 6:
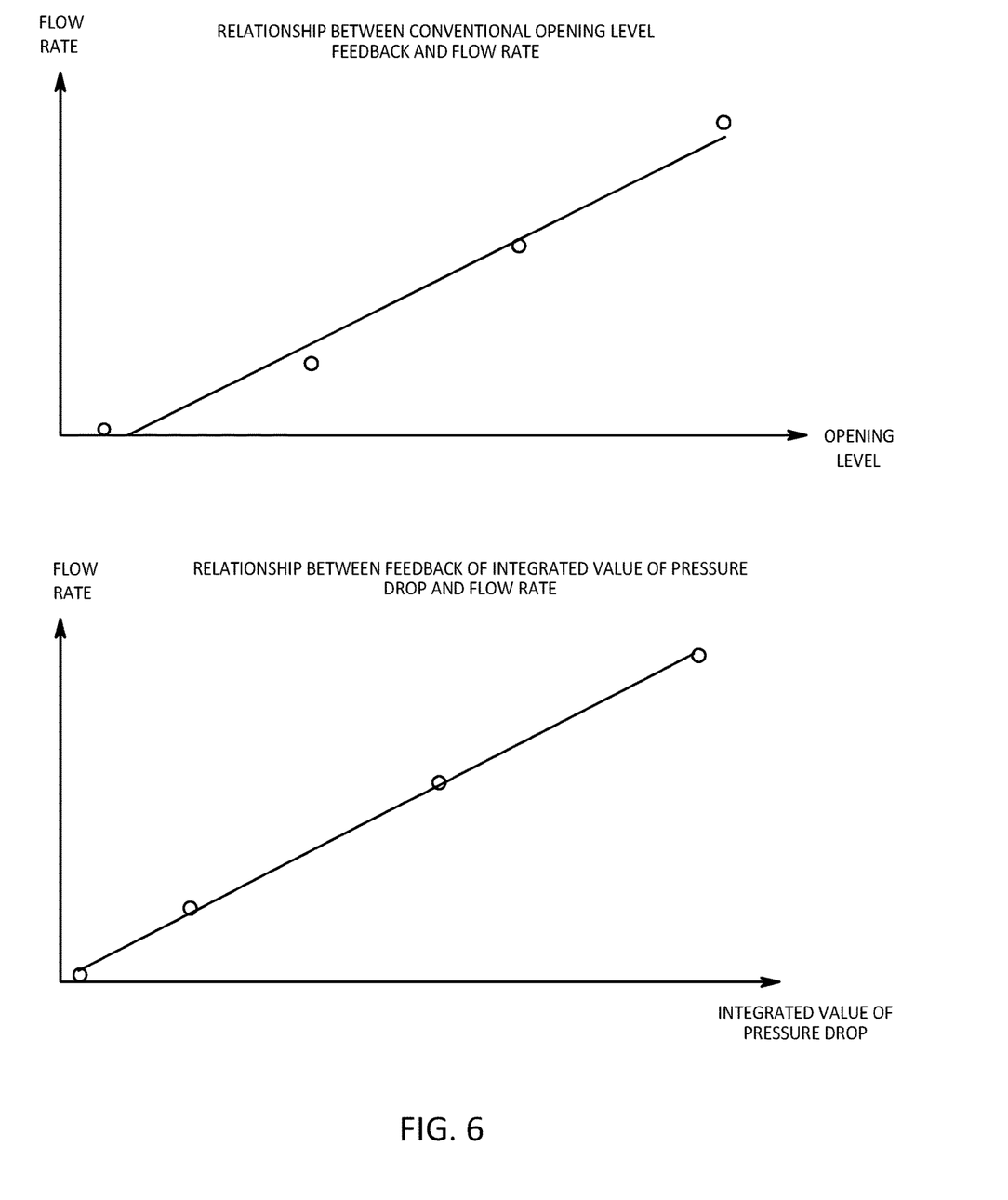
FIG. 6 includes graphs illustrating the control accuracy of a conventional fluid control device and that of the fluid control device of the first embodiment.

More specifically, as illustrated in graphs of FIG. 6, as compared with a conventional case of feeding back the opening level of the first valve 3 to perform pulse control, in the case of feeding back the time integrated value of a pressure drop to perform pulse control, the linearity between a value to be fed back and an actual flow rate can be more improved than before. Accordingly, as compared with the conventional case of measuring the opening level to feed back it, the control accuracy of an actual flow rate can be increased.

On the basis of these effects, each pulse signal makes it possible to regulate the flow rate of each gas flowing into the deposition chamber CH through the first valve 3 to an amount necessary and sufficient to form, for example, a film of one atomic layer, and therefore high-quality film deposition can be performed in the ALD apparatus.

Also, since the signal compensator 8 changes only the pulse height to regulate the flow rate of the gas flowing in the state where the first valve 3 is opened with the pulse width and the period fixed, for example, even when introducing the gas into the deposition chamber CH while performing many cycles, the time necessary for the start to the end does not change. That is, by setting a recipe for the ALD apparatus to increase the accuracy of a flow rate without changing a process time, high productivity can be kept.

Configuration of Second Embodiment

Figure 7:
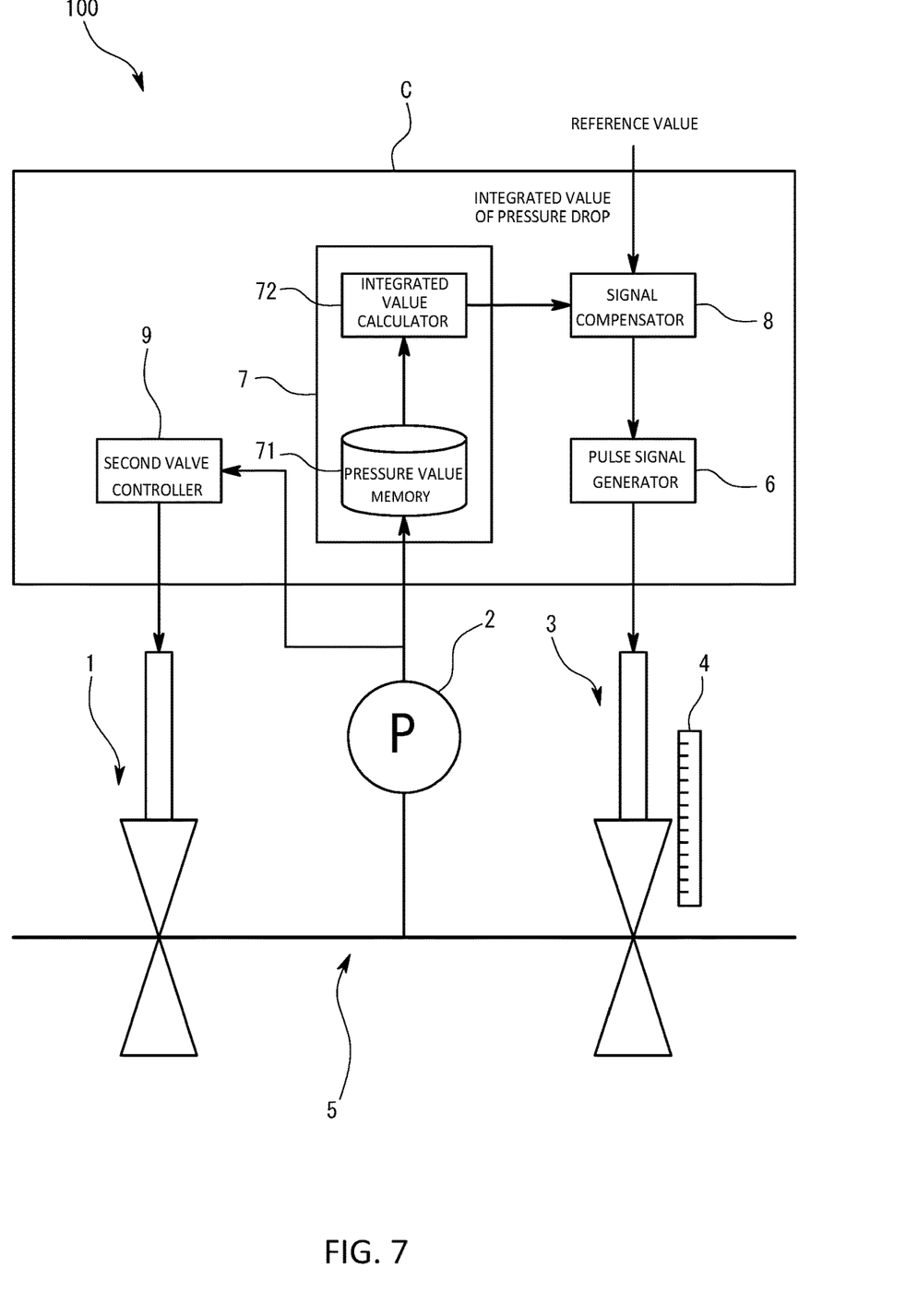
FIG. 7 is a schematic diagram illustrating the hardware and software configuration of a fluid control device according to a second embodiment of the present invention.

Next, a fluid control device 100 according to a second embodiment of the present invention will be described with reference to FIGS. 7 and 8.

As compared with the first embodiment, the fluid control device 100 of the second embodiment is different in that a resistor 1 is a second valve 1 and a control mechanism C includes a second valve controller 9 adapted to control the second valve 1. Specifically, the second embodiment is adapted to be capable of regulating flow path resistance to fluid flowing into the internal volume 5 by changing the opening level of the second valve 1.

As with the first valve 3, the second valve 1 is configured be capable of changing the opening level equivalent to the position of a valve body with respect to a valve seat by making a piezo actuator drive the valve body.

The second valve controller 9 controls the opening level of the second valve 1 on the basis of the pressure value of the gas inside the internal volume 5 measured by the pressure sensor 2. Specifically, the second valve controller 9 controls voltage to be applied to the second valve 1 so as to decrease the deviation between the pressure value measured by the pressure sensor 2 and a predetermined setting pressure value. Note that the setting pressure value refers to a pressure value that in order to obtain a target flow rate, the internal volume 5 should keep at the point when a pulse signal is inputted to the first valve 3 to open the first valve 3. The second embodiment is configured to control the second valve 1 and thereby charge the same pressure into the internal volume 5 at least just before the first valve 3 is opened.

Operation of Second Embodiment

Figure 8:
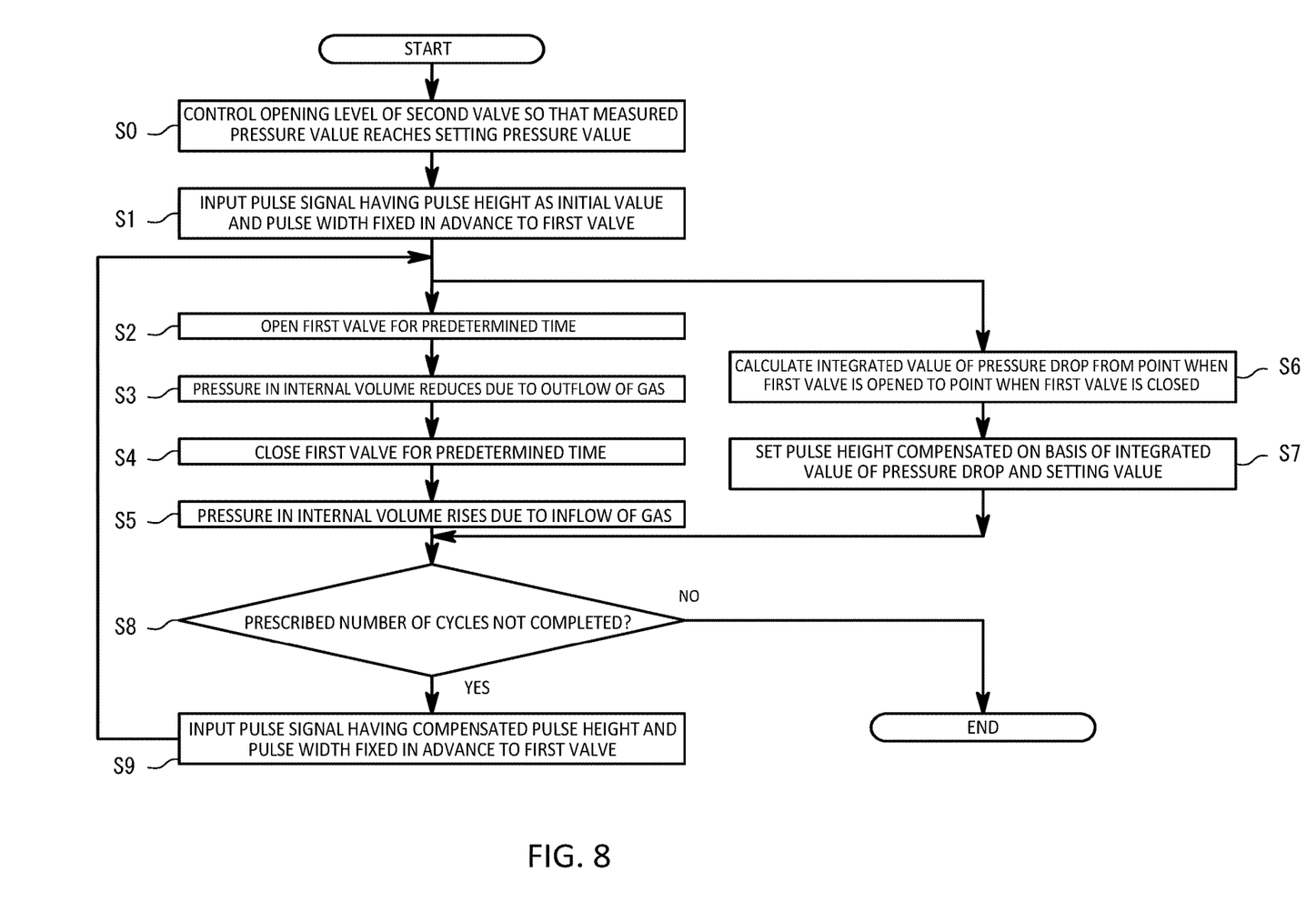
FIG. 8 is a flowchart illustrating the operation of the fluid control device in the second embodiment.

As illustrated in a flowchart of FIG. 8, the fluid control device 100 of the second embodiment performs the same operation from Steps S1 to S9 as the fluid control device 100 of the first embodiment does. However, during an interval from a state before performing Step S1 to the completion of all cycles, the opening level of the second valve 1 continues to be controlled by pressure feedback so that a pressure value measured by the pressure sensor 2 reaches the setting pressure value (Step S0).

Effects of Second Embodiment

Since the fluid control device 100 configured as described above is adapted to make the second valve 1 keep the pressure of the gas in the internal volume 5 at the setting pressure value before inputting a pulse signal to the first valve 3 to start an ON interval, the difference in pressure between before and after the first valve 3 can be always kept constant at the start of each ON interval. For this reason, physical quantity that is not a control target other than pulse height can be kept constant, and therefore the control accuracy of the flow rate of the gas passing through the first valve 3 at each cycle can be further improved.

Configuration of Third Embodiment

Figure 9:
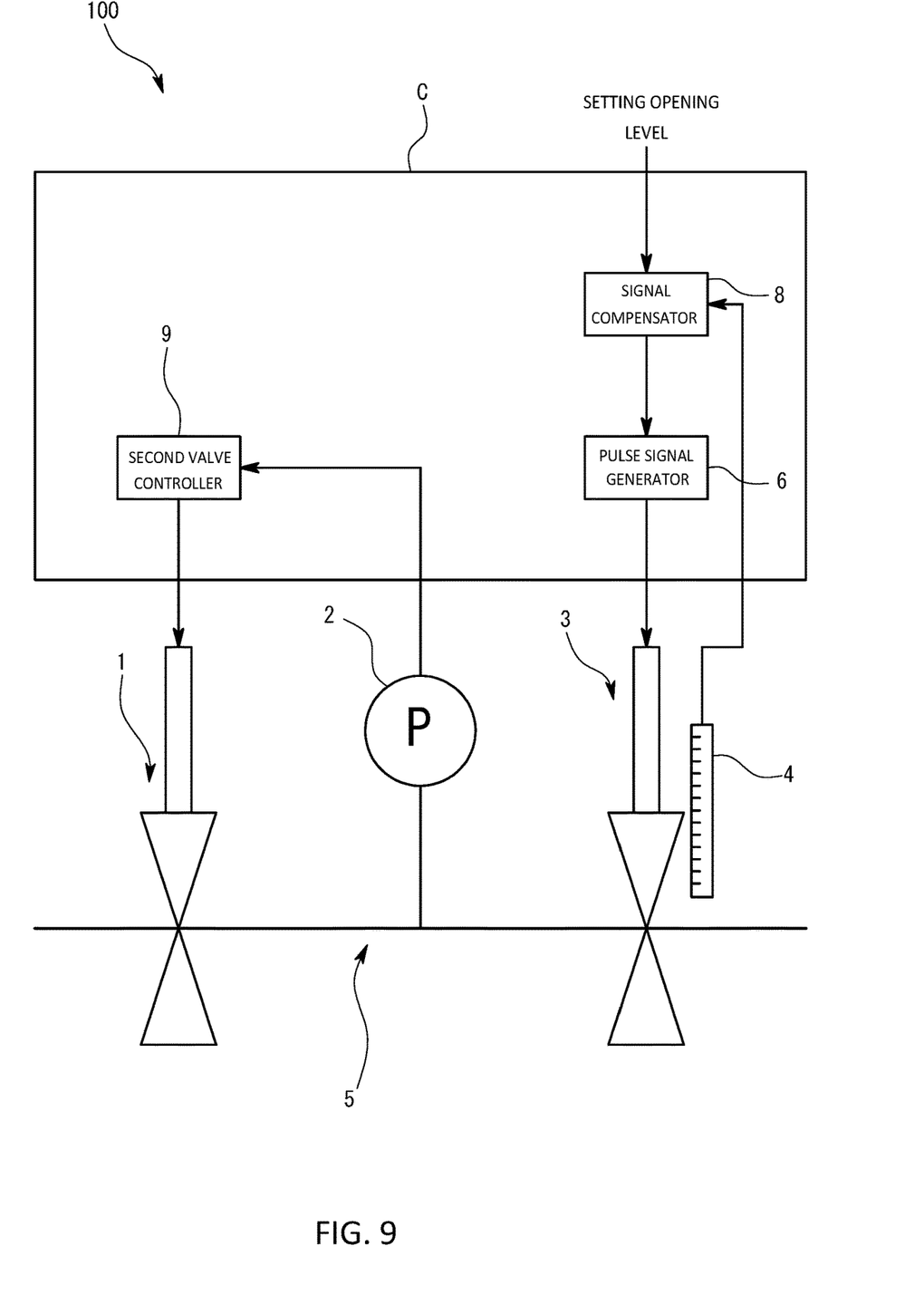
FIG. 9 is a schematic diagram illustrating the hardware and software configuration of a fluid control device according to a third embodiment of the present invention.
Figure 10:
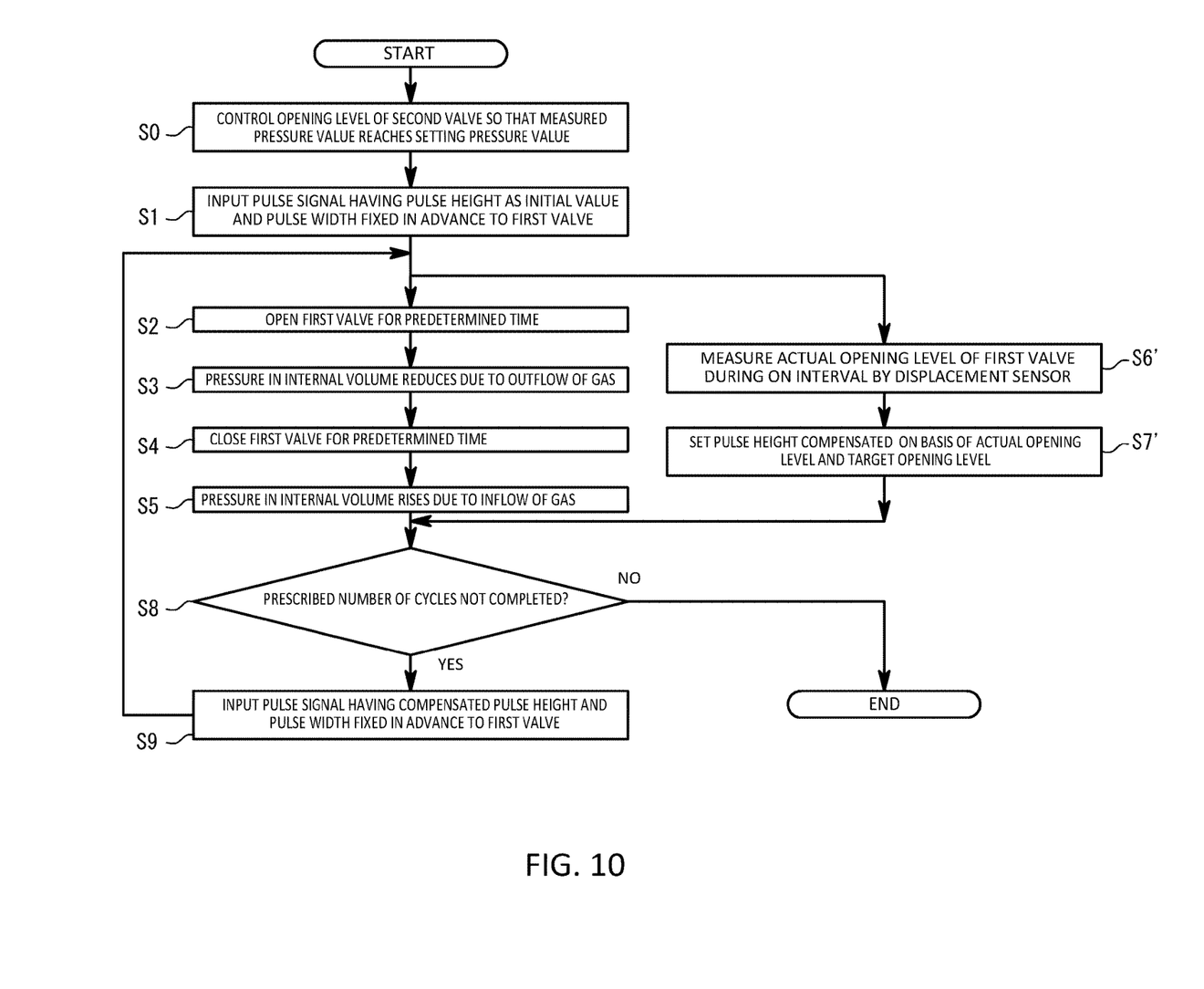
FIG. 10 is a flowchart illustrating the operation of the fluid control device in the third embodiment.

Next, a fluid control device 100 according to a third embodiment of the present invention will be described with reference to FIGS. 9 and 10.

As compared with the second embodiment, the fluid control device 100 of the third embodiment is different in that a first valve 3 is controlled not by feeding back the time integrated value of a pressure drop but by feeding back an actual opening level measured by a displacement sensor 4.

More specifically, the feedback value calculator 7 in the first and second embodiments is omitted from a control mechanism C in the third embodiment.

Further, a signal compensator 8 is configured to, on the basis of the deviation between an actual opening level measured by the displacement sensor 4 and a predetermined setting opening level, compensate the pulse height of a pulse signal outputted from the pulse signal generator 6. Specifically, the signal compensator 8 is configured to measure the opening level of the first valve 3 by the displacement sensor 4 when one pulse signal is outputted, and on the basis of the actual opening level, change the setting of the pulse signal generator 6 (the pulse height of the next pulse signal) so as to bring the actual opening level close to the setting opening level.

The setting opening level refers to, for example, the actual value of an opening level necessary to flow the fluid at a target flow rate in a state where the upstream side of the first valve 3 is kept at a setting pressure, and the downstream side is kept vacuum.

Operation of Fluid Control Device 100 of Third Embodiment

As compared with the operation of the fluid control device 100 of the second embodiment illustrated in FIG. 8, the operation of the fluid control device 100 of the third embodiment is different only in operation in Steps S6 and S7. That is, the fluid control device 100 of the third embodiment measures the actual opening level of the first valve 3 during an ON interval by the displacement sensor 4 (Step S6'), and on the basis of the actual opening level and the setting opening level, changes a compensation amount for the pulse height of a pulse signal to be outputted next (Step S7').

Effects of Fluid Control Device 100 of Third Embodiment

Since the fluid control device 100 of the third embodiment configured as described above is adapted to make the second valve 1 keep the pressure of internal volume 5 at the setting pressure, even when performing pulse control of the first valve 3 on the basis of the opening level feedback, the control accuracy of a flow rate can be more improved than before.

Also, since it is not necessary to perform calculation such as integration for calculating a feedback value, and therefore a calculation load is small, even when a pulse width and a period are short, and the time necessary for calculation is short, the opening level feedback can be performed well in advance. That is, without using a high-speed CPU or the like in the control mechanism C, a flow rate can be controlled with high accuracy at each cycle.

Further, the pressure of the gas in the internal volume 5 is controlled to be kept constant by the second valve 1, and therefore even when the pressure of the gas varies on the upper stream side than the second valve 1, the effect of such variation on the control accuracy of the flow rate of the gas passing through the first valve 3 can be almost eliminated. That is, the robustness of the flow rate control can be enhanced. In addition, the linearity between an opening level and a flow rate can be obtained over a wide flow rate range, and therefore, for example, only by determining one calibration curve, a flow rate can be accurately controlled over a wide range.

Other embodiments will be described.

Each of the embodiments is adapted to keep the flow rate of the fluid passing through the first valve at a constant value at each cycle by compensating the pulse height of a pulse signal, but may be adapted to control the flow rate by, for example, compensating the pulse width of a pulse signal. Also, the flow rate may be kept constant at each cycle by compensating both the pulse height and the pulse width.

The reference value used in the signal compensator is not preliminarily determined but may be set using several pulses after the start of pulse control as adjustment pulses. Specifically, when the time integrated value of a pressure drop measured after the several pulses since the start of the pulse control becomes a value corresponding to a target flow rate, the time integrated value may be set as the reference value. In addition, when only after the several pulses since the start of pulse control, the time integrated value of a pressure drop is fed back and reaches the reference value, subsequent operation may be continued with the same pulse height and pulse width kept without operating the signal compensator.

In the above-described embodiments, the signal compensator compensates the pulse height or pulse width of one pulse signal on the basis of the integrated value of a pressure drop caused during an ON interval by a pulse signal outputted just before the one pulse, but may be configured to compensate a currently outputted pulse signal on the basis of the integrated value of a pressure drop caused during an ON interval by, for example, a pulse signal two or three pulse signals before. Further, on the basis of the integrated value of a pressure drop caused during an ON interval by one pulse signal, the pulse height or pulse width of the pulse signal may be compensated during the same ON interval. For example, on the basis of the integrated value of a pressure drop obtained during, for example, the first half of the ON interval, the pulse signal during the latter half of the ON interval may be compared with the reference value and compensated. Alternatively, for example, while successively calculating the integrated value of a pressure drop, the pulse height of a pulse signal may be successively changed.

The fluid control device is not one adapted to control the flow rate of fluid passing through the first valve, but may be one adapted to control pressure.

The fluid control device according to the present invention may be used for pulse supply of fluid in various applications without limitation to ALD.

Any of the first and second valves is not limited to one using a piezo actuator, but may be one whose valve body is driven by various actuators such as a solenoid.

The resistor only has to be one forming flow path resistance, but is not limited to one described in each of the embodiments.

A method for calculating the time integrated value of a pressure drop is not limited to the quadrature by parts, but may be various methods for the calculation. For example, on the basis of only pressure values at the start and end points of an ON interval, the area of a triangle region may be used as the approximate value of the time integrated value of a pressure drop.

Besides, various embodiments may be combined and modified without departing from the scope of the present invention.

LIST OF REFERENCE CHARACTERS

100: Fluid control device
1: Resistor (second valve)
2: Pressure sensor
3: First valve
4: Displacement sensor
5: Internal volume
6: Pulse signal generator
7: Feedback value calculator
71: Pressure value memory
72: Integrated value calculator
8: Signal compensator
9: Second valve controller

The invention claimed is:
1. A fluid control device comprising:
a resistor arranged in a flow path through which fluid flows;
a first valve arranged on a downstream side than the resistor in the flow path;
a pressure sensor that is arranged between the resistor and the first valve in the flow path and measures pressure of the fluid in an internal volume between the resistor and the first valve; and
a control mechanism adapted to control the first valve, wherein
the control mechanism comprises:
a pulse signal generator adapted to input a pulse signal having a predetermined pulse height and a predetermined pulse width to the first valve;
a feedback value calculator adapted to calculate a feedback value on a basis of a pressure value measured by the pressure sensor, and the feedback value is a time integrated value of a pressure drop occurring in the internal volume during an ON interval when the first valve is opened; and
a signal compensator adapted to, on a basis of a deviation between the feedback value and a reference value, compensate the pulse signal to be inputted from the pulse signal generator to the first valve, and
the first valve further comprises a displacement sensor adapted to measure an opening level thereof.

2. The fluid control device according to claim 1, wherein the reference value is an actual value of a time integrated value of a pressure drop when a flow rate of the fluid passing through the first valve reaches a target flow rate.

3. The fluid control device according to claim 1, wherein the signal compensator is configured to change the pulse height of the pulse signal with the pulse width kept constant so as to decrease the deviation between the feedback value and the reference value.

4. The fluid control device according to claim 1, wherein the signal compensator is configured to change the pulse width of the pulse signal with the pulse height kept constant so as to decrease the deviation between the feedback value and the reference value.

5. The fluid control device according to claim 1, wherein the resistor is a second valve whose opening level is controllable, and
the control mechanism further comprises:
a second valve controller adapted to control the second valve so as to decrease a deviation between a pressure value measured by the pressure sensor and a setting pressure value during an OFF interval when the first valve is closed.

6. A fluid control device comprising:
a second valve that is a resistor arranged in a flow path through which fluid flows;
a first valve arranged on a downstream side than the resistor in the flow path;
a pressure sensor that is arranged between the resistor and the first valve in the flow path and measures pressure of the fluid in an internal volume between the resistor and the first valve; and
a control mechanism adapted to control the first valve and the second valve, wherein
the first valve further comprises a displacement sensor adapted to measure an opening level thereof, and
the control mechanism comprises:
a second valve controller adapted to control the second valve so as to decrease a deviation between a pressure value measured by the pressure sensor and a setting pressure value during an OFF interval when the first valve is closed;

a pulse signal generator adapted to input a pulse signal having a predetermined pulse height and a predetermined pulse width to the first valve; and a signal compensator adapted to, on a basis of a deviation between a measured opening level measured by the displacement sensor and a predetermined setting opening level during an ON interval when the first valve is opened, compensate the pulse signal to be inputted from the pulse signal generator to the first valve.

7. A fluid control method using a fluid control device comprising: a resistor arranged in a flow path through which fluid flows; a first valve arranged on a downstream side than the resistor in the flow path; and a pressure sensor that is arranged between the resistor and the first valve in the flow path and measures pressure of the fluid in an internal volume between the resistor and the first valve, the fluid control method comprising a control step of controlling the first valve, wherein the control step comprises:

a pulse signal generation step of inputting a pulse signal having a predetermined pulse height and a predetermined pulse width to the first valve;

a feedback value calculation step of on a basis of a pressure value measured by the pressure sensor, as a feedback value, calculating a time integrated value of a pressure drop occurring in the internal volume during an ON interval when the first valve is opened; and a signal compensation step of, on a basis of a deviation between the feedback value and a reference value, compensating the pulse signal to be inputted to the first valve, and the first valve comprises a displacement sensor adapted to measure an opening level thereof.

8. A non-transitory program recording medium recorded with a program for a fluid control device, the program used for the fluid control device comprising: a resistor arranged in a flow path through which fluid flows; a first valve arranged on a downstream side than the resistor in the flow path; a pressure sensor that is arranged between the resistor and the first valve in the flow path and measures pressure of the fluid in an internal volume between the resistor and the first valve; and a control mechanism adapted to control the first valve, wherein the control mechanism has a computer, the program instructing the computer to fulfill functions as:

a pulse signal generator adapted to input a pulse signal having a predetermined pulse height and a predetermined pulse width to the first valve;

a feedback value calculator adapted to on a basis of a pressure value measured by the pressure sensor, as a feedback value, calculate a time integrated value of a pressure drop occurring in the internal volume during an ON interval when the first valve is opened; and a signal compensator adapted to, on a basis of a deviation between the feedback value and a reference value, compensate the pulse signal to be inputted from the pulse signal generator to the first valve, wherein the first valve comprises a displacement sensor adapted to measure an opening level thereof.

9. The fluid control method according to claim 7, wherein the signal compensation step further comprises changing the pulse height of the pulse signal with the pulse width kept constant or changing the pulse width of the pulse signal with the pulse height kept constant so as to decrease the deviation between the feedback value and the reference value.

10. The non-transitory program recording medium according to claim 8, wherein the signal compensator is further adapted to changing the pulse height of the pulse signal with the pulse width kept constant or changing the pulse width of the pulse signal with the pulse height kept constant so as to decrease the deviation between the feedback value and the reference value.

* * * * *